(12) United States Patent
Kuroki

(10) Patent No.: US 7,321,471 B2
(45) Date of Patent: Jan. 22, 2008

(54) LENS BARREL AND LENS SYSTEM

(75) Inventor: Takayuki Kuroki, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 11/522,417

(22) Filed: Sep. 18, 2006

(65) Prior Publication Data
US 2007/0064319 A1    Mar. 22, 2007

(30) Foreign Application Priority Data
Sep. 16, 2005  (JP) ............................. 2005-270420

(51) Int. Cl.
*G02B 15/14* (2006.01)
*G03B 17/00* (2006.01)

(52) U.S. Cl. .................... 359/699; 359/694; 359/695; 359/698; 359/700; 359/701; 359/704; 359/706; 396/79; 396/84

(58) Field of Classification Search ............... 359/811, 359/819, 694–704, 706; 396/72, 79, 84; 348/75, 335, 357
See application file for complete search history.

(56) References Cited

U.S. PATENT DOCUMENTS

| | | | |
|---|---|---|---|
| 4,089,590 A | | 5/1978 | Sakata |
| 4,472,032 A | * | 9/1984 | Kamata et al. ............ 359/694 |
| 5,091,802 A | * | 2/1992 | Imaoka et al. ............ 359/694 |
| 5,151,729 A | | 9/1992 | Takayama |
| 5,526,188 A | * | 6/1996 | Kanno et al. ............. 359/698 |
| 5,786,946 A | * | 7/1998 | Imura ...................... 359/695 |
| 6,580,566 B1 | | 6/2003 | Kamoda |
| 6,714,358 B2 | * | 3/2004 | Nishikawa ............... 359/699 |

FOREIGN PATENT DOCUMENTS

| JP | PAJ 2001-091813 A | 4/2001 |
|---|---|---|
| JP | 2001-91813 A | 8/2007 |

* cited by examiner

*Primary Examiner*—Loha Ben
(74) *Attorney, Agent, or Firm*—Jacobson Holman PLLC

(57) ABSTRACT

The invention is directed to a lens barrel and a compact lens system incorporating the lens barrel where notches defined in a cam barrel to serve as bolt holes and disengage the studs are reduced in dimensions both along and around the optical axis, thereby ensuring enlarged cam formation ranges in the cam barrel and resultantly downsizing the lens system as a whole. The lens system of the present invention comprises a foremost group of lens elements closest to the object, a rearmost group of lens elements farthest from the object, a first fixed barrel, a linearly-shuttling barrel residing inside the first fixed barrel so as to be slidable along the optical axis, for carrying the rearmost group of lens elements, a cam barrel having at least two types of cams and residing outside the first fixed barrel so as to be rotatable about the optical axis, a second fixed barrel residing outside the cam barrel, linearly-sliding studs positioned in a forward edge of the linearly-shuttling barrel closer to the object, and a lens barrel residing over an inner surface of the second fixed barrel so as to be slidable thereover and provided with linear grooves in which the linearly-sliding studs fitted, for carrying the foremost group of lens elements.

8 Claims, 5 Drawing Sheets

LENS BARREL AND LENS SYSTEM

FIELD OF THE INVENTION

The present invention relates to a lens barrel and a lens system incorporating the same, and more particularly, it relates to a lens barrel for a lens of groups of lens elements, and a lens system having such a lens barrel. The "lens system" as used herein is a lens optics surrounded by the lens barrel.

BACKGROUND ART

The lens system of groups of lens elements uses mechanisms such as cam to shift the groups of lens elements independent of one another along the optical axis, thereby attaining zooming and focusing adjustments. In the case of the zoom lens of three groups of lens elements, a cam barrel of synthetic resin is provided with three cam grooves or cam ridges, so as to obtain a zoom lens having improved features of the reduced number of components, a simplified structure, and an ensured operation (see Patent Document 1 listed below).

A prior art zoom lens disclosed in Patent Document 1 includes, as shown in FIGS. 4 and 5, first to third groups of lens elements respectively denoted by reference numerals 110, 112, and 114. The zoom lens includes a first fixed barrel 122, a cam barrel 126 of synthetic resin disposed outside the first fixed barrel, and studs 180 related to the first group of lens elements where the cam barrel 126 is provided with a single type of cam related to the first group of lens elements 110 closest to the object and at least two types of the cam, 162 and 164, related to two or more groups of lens elements including the second group and/or the one(s) behind it, and the studs 180 are fixed to a forward extension of the fixed barrel 122 to scotch the revolving cam barrel 126. The cam barrel 126 slides over the first fixed barrel 122 but is inhibited from moving simply along the optical axis.

This arrangement takes a half measure of notches 200 at the foremost edge of the cam barrel 126 to receive the studs 180 for the incorporation of both the cam barrel 126 and the studs 180, as shown in FIG. 5. Since the studs 180 related to the first group of lens elements are fixed to the first fixed barrel 122 at closer locations to the object, the notches 200 to receive the studs carrying the first group of lens elements are deployed, circumferentially extending in a plane orthogonal to the optical axis.

List of Document Cited Herein

Patent Document 1: Japanese Patent Preliminary Publication No. 2001-91813

The zoom lens disclosed in Patent Document 1 is, as stated above, provided with the notches 200 circumferentially extending in the plane orthogonal to the optical axis, and this restricts a forward dimension and a shape of the foremost edge of the cam barrel 126. Specifically, in the case that there are three of the studs 180 and the cam barrel 126 revolves within a rotation range up to 90-degree angle, there remains a space occupied by three 30-degree revolving cam ranges in the foremost edge extended forwardly from the cam barrel 126. Cams are typically deployed along a spiral line about the optical axis, and the 30-degree revolving ranges are excessively narrow to the cams, or rather, substantially it is impossible to deploy the cams in that forward extension of the cam barrel.

The zoom lens disclosed in Patent Document 1 has disadvantages as mentioned below:

First, since the cams, which are preferably deployed in a spiral line about the optical axis, cannot be accommodated in an excessively narrow deployment within the 30-degree revolving ranges, it is substantially impossible to dispose the cams in the forward extension from the cam barrel, and resultantly, the lens system must be oversized.

Second, a barrel 128 carrying the first group of lens elements is held between the studs 180 and an inner surface of a second fixed barrel 130, and hence, in the event of a wide-end setting where the lens elements of the first group are in positions closest to the object, the studs 180 press down the shuttling barrel 128 against the inner surface of the second fixed barrel 130 at points only a short distance from terminated edges of the barrels, resulting the first group of lens elements in being held unstably.

Third, first linear grooves 182, which are formed in the barrel 128 supporting the first group of lens elements 110, are to be identical in length to a displacement of the first group of lenses 110 along the optical axis, and thus, the lens barrel 128 must have a longitudinal extension sufficiently long, exceeding the displacement of the first group of lens elements 110 along the optical axis. This brings about the disadvantages of preventing the lens system from being downsized, and increasing in costs for the materials and the mold manufacturing.

The present invention is made to overcome the aforementioned disadvantages of the prior art zoom lens, and accordingly, first of all, it is an object of the present invention to provide a lens barrel and a compact lens system incorporating the lens barrel where studs carrying the foremost group of lens elements are movable along the optical axis integratedly with the rearmost group of lens elements and components holding the same, so that notches defined in a cam barrel to serve as bolt holes and disengage the studs are reduced in dimensions both along and around the optical axis, thereby ensuring enlarged cam formation ranges in the cam barrel and resultantly downsizing the lens system as a whole.

It is another or a second object of the present invention to provide a lens barrel and a lens system incorporating the lens barrel where in the event of a wide-angle setting where the lenses of the foremost group are in their respective closest positions to the object, linearly-sliding studs press down a shuttling barrel against an inner surface of a fixed barrel at points sufficiently away from terminated edges of the barrels so as to stably hold the foremost group of lens elements.

It is still another or a third object of the present invention to provide a lens barrel and a lens system incorporating the lens barrel where it is unnecessary to extend linear grooves in a lens barrel related to the foremost group of lens elements in concurrence with an extended displacement of that group of lens elements along the optical axis, and the lens barrel itself can decrease a length along the optical axis. Resultantly, the lens system, as a whole, can be downsized and reduce costs for the materials and the mold manufacturing.

SUMMARY OF THE INVENTION

A lens system in a first aspect of the present invention comprises a foremost group of lens elements closest to the object, a rearmost group of lens elements farthest from the object, a first fixed barrel, a linearly-shuttling barrel residing inside the first fixed barrel so as to be slidable along the optical axis, for carrying the rearmost group of lens elements, a cam barrel having at least two types of cams and residing outside the first fixed barrel so as to be rotatable about the optical axis, a second fixed barrel residing outside the cam barrel, linearly-sliding studs positioned in a forward edge of the linearly-shuttling barrel closer to the object, and a lens barrel residing over an inner surface of the second fixed barrel so as to be slidable thereover and provided with linear grooves in which the linearly-sliding studs are fitted, for carrying the foremost group of lens elements.

An embodiment of the zoom lens system of three groups, namely, first to third groups of lens elements in the first aspect of the invention will be detailed below.

In the lens system, recessed edges of the notches defined in the cam barrel closer to a mount are in positions behind forward ends of at least one type of the cams in the cam barrel closer to the object.

The foremost group of lens elements in the lens system in the first aspect of the present invention is a first group of lens elements while the rearmost lens elements are a third group of lens elements.

The lens system in the first aspect of the invention is a fixed focus lens system where the foremost and rearmost groups of lens elements surrounded by a lens barrel incorporated in the lens system serve as focusing lenses.

A lens barrel in a second aspect of the present invention comprises a first fixed barrel, a linearly-shuttling barrel residing inside the first fixed barrel so as to be slidable along the optical axis, for carrying a rearmost group of lens elements, a cam barrel having at least two types of cams and residing outside the first fixed barrel so as to be rotatable about the optical axis, a second fixed barrel residing outside the cam barrel, linearly-sliding studs positioned in a forward edge of the linearly-shuttling barrel closer to the object, and a lens carrying barrel residing over an inner surface of the second fixed barrel so as to be slidable thereover and provided with linear grooves in which the linearly-sliding studs fitted, for carrying a foremost group of lens elements.

An embodiment of the lens barrel of three groups, namely, first to third groups of lens elements in the second aspect of the invention will be detailed below.

In the lens barrel, recessed edges of the notches defined in the cam barrel closer to a mount are in positions behind forward ends of at least one type of the cams in the cam barrel closer to the object.

The foremost group of lens elements surrounded by the lens barrel in the second aspect of the present invention is a first group of lens elements while the rearmost lens elements is a third group of lens elements.

The lens barrel in the second aspect of the invention is a fixed focus lens barrel where the foremost and rearmost groups of lens elements surrounded by the lens barrel serve as focusing lenses.

In the lens barrel and the compact lens system according to the present invention, studs carrying the foremost group of lens elements are movable along the optical axis integratedly with the rearmost group of lens elements and components holding the same, so that notches defined in a cam barrel to serve as bolt holes and disengage the studs are reduced in dimensions both along and around the optical axis, thereby ensuring enlarged cam formation ranges in the cam barrel and resultantly downsizing the lens system as a whole.

In the lens barrel and the lens system according to the present invention, in the event of a wide-angle setting where the foremost group of lens elements are in their respective closest positions to the object, linearly-sliding studs press down a shuttling barrel against an inner surface of a fixed barrel at points sufficiently away from terminated edges of the barrels so as to stably hold the foremost group of lens elements.

In the lens barrel and the lens system according to the present invention, it is unnecessary to extend linear grooves in a component barrel carrying the foremost group of lens elements in concurrence with an extended displacement of that group of lens elements along the optical axis, and the component barrel itself can decrease a length along the optical axis. Resultantly, the lens system, as a whole, can be downsized and reduce costs for the materials and the mold manufacturing.

DETAILED DESCRIPTION OF THE INVENTION

A best mode of a lens barrel and a lens system incorporating it according to the present invention will be described in conjunction with the accompanying drawings.

Embodiment 1

Figure 1:
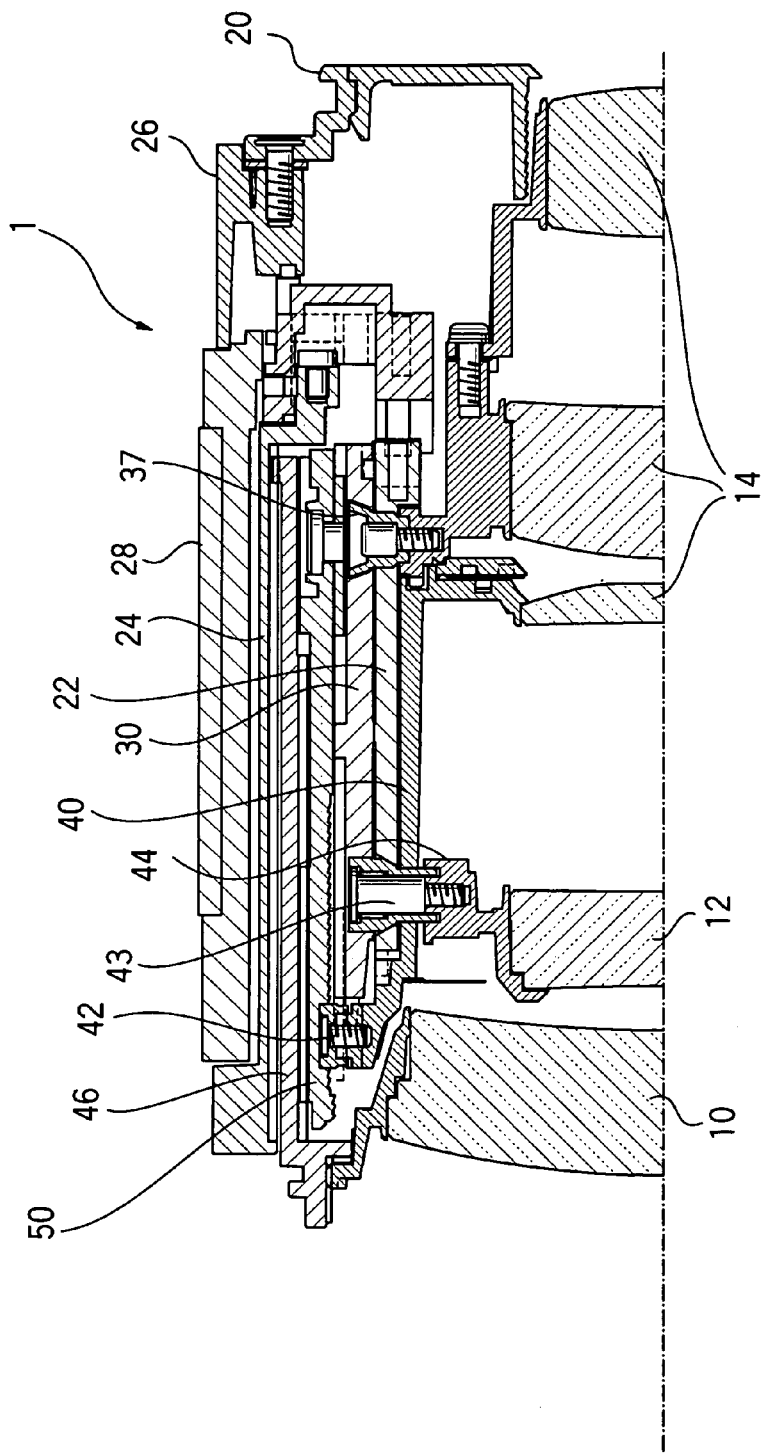
FIG. 1 is a sectional view showing a first preferred embodiment of a three-lens-group zoom lens system incorporating a lens barrel in a telephoto adjusting setting.
Figure 2:
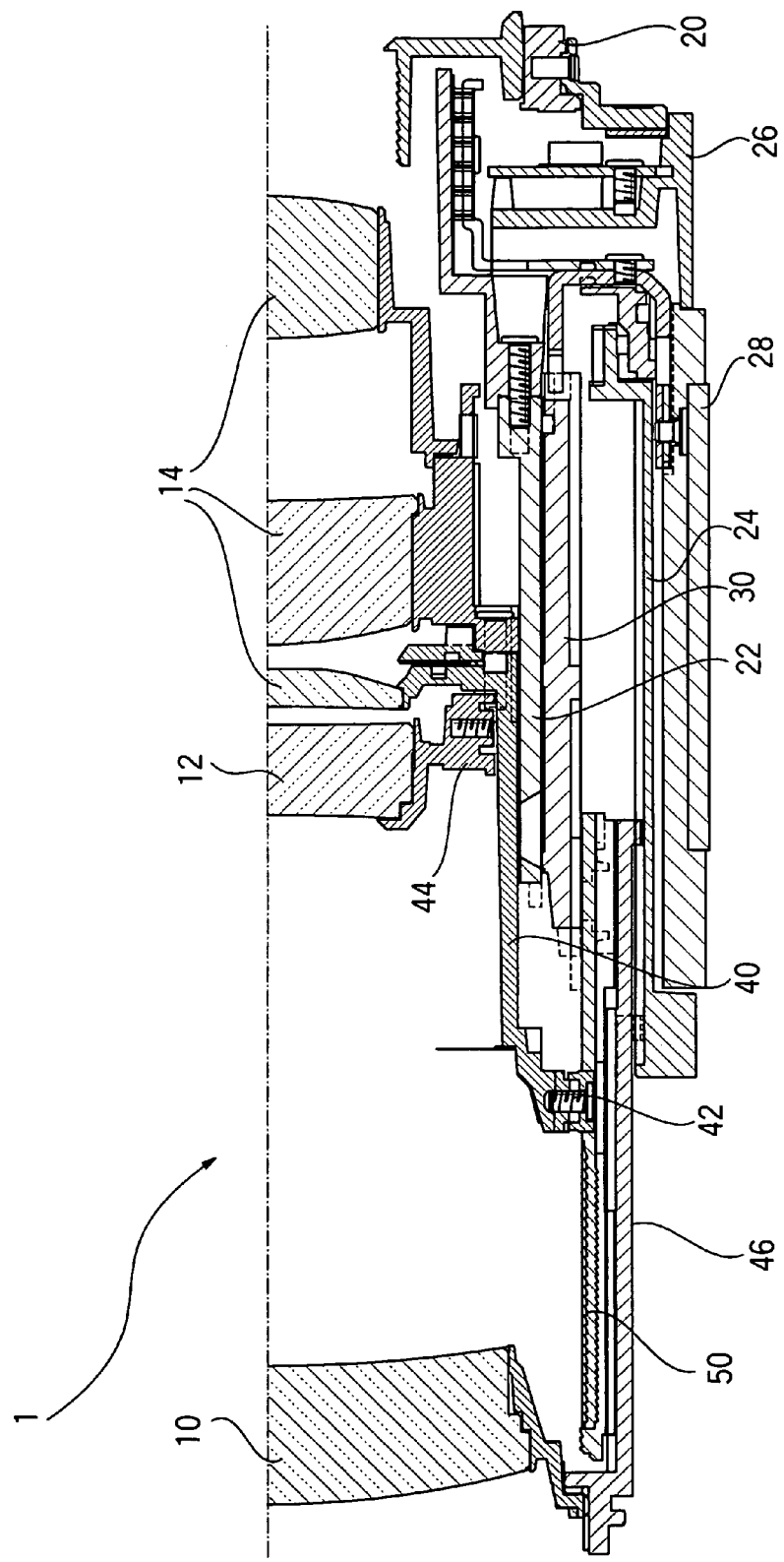
FIG. 2 is a sectional view showing the first preferred embodiment of the three-lens-group zoom lens system incorporating the lens barrel in a wide-angle adjusting setting.
Figure 3:
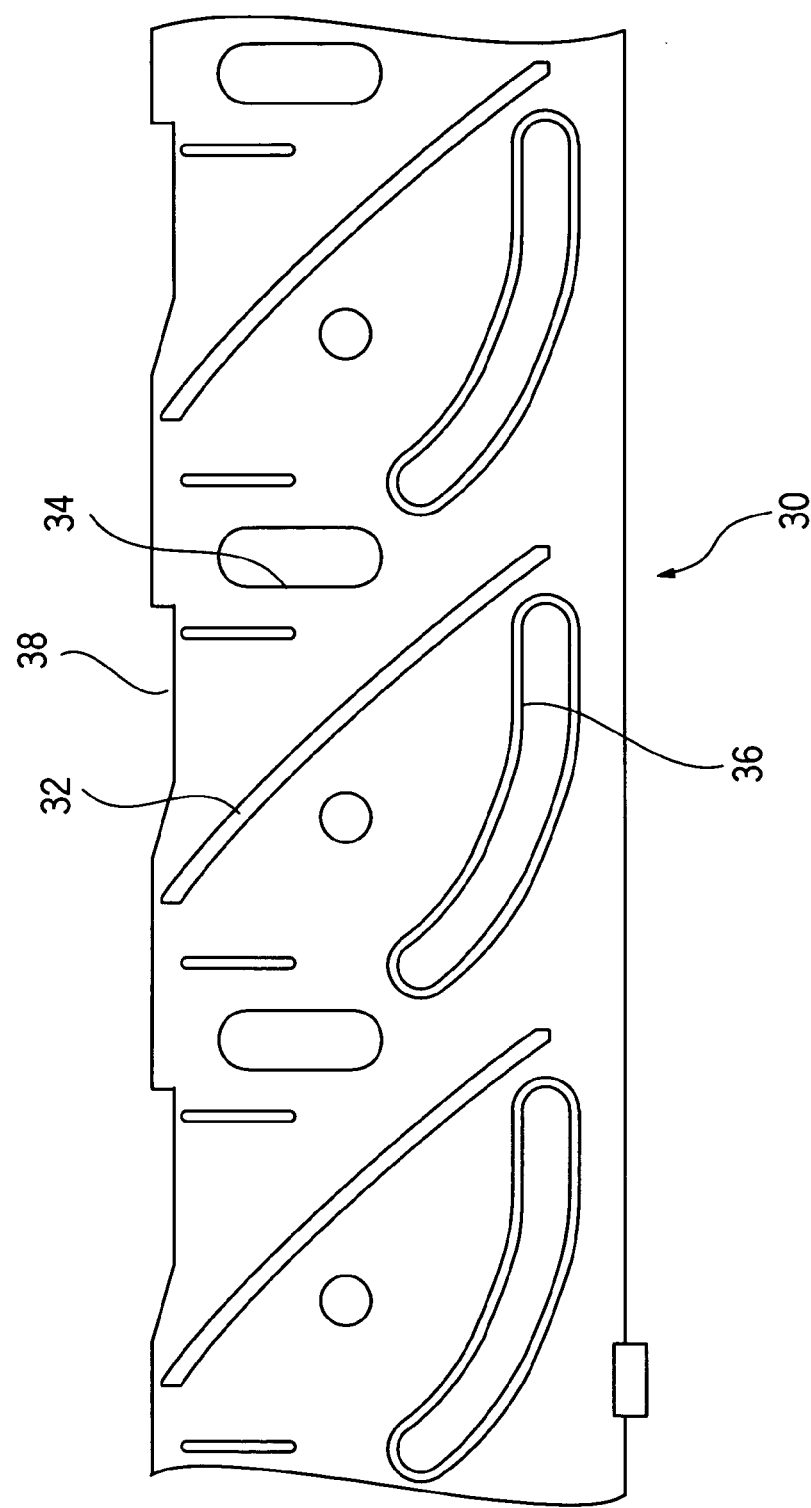
FIG. 3 is an exploded view showing a cam barrel in the first preferred embodiment.
Figure 4:
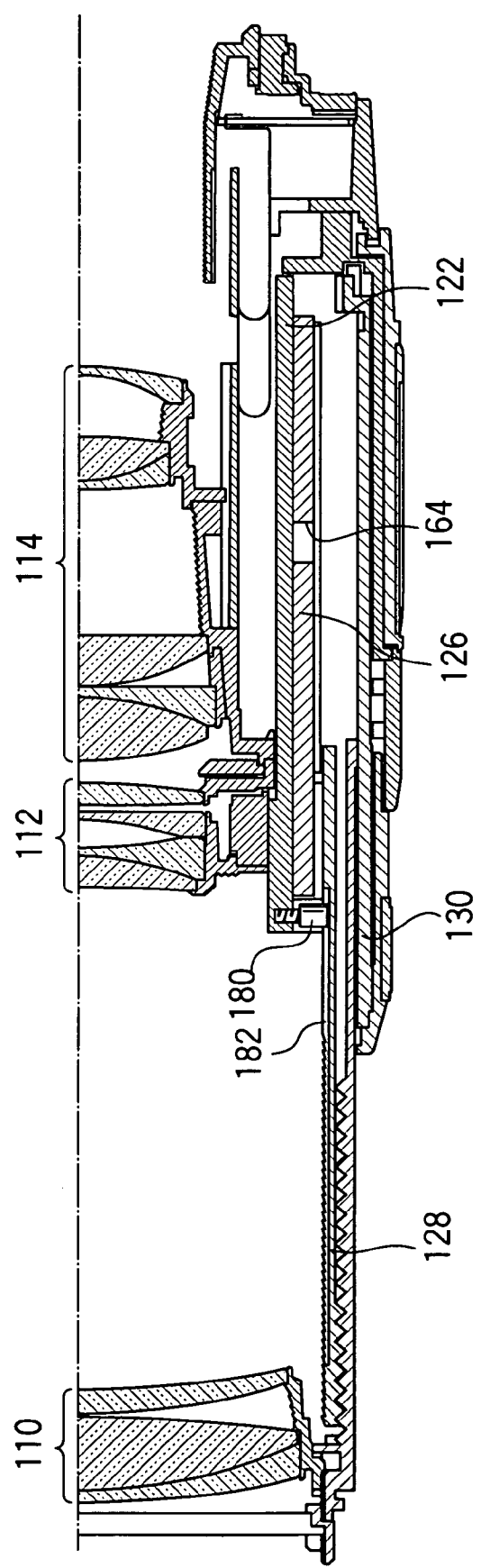
FIG. 4 is a sectional view showing a prior art zoom lens cited as Patent Document 1.
Figure 5:
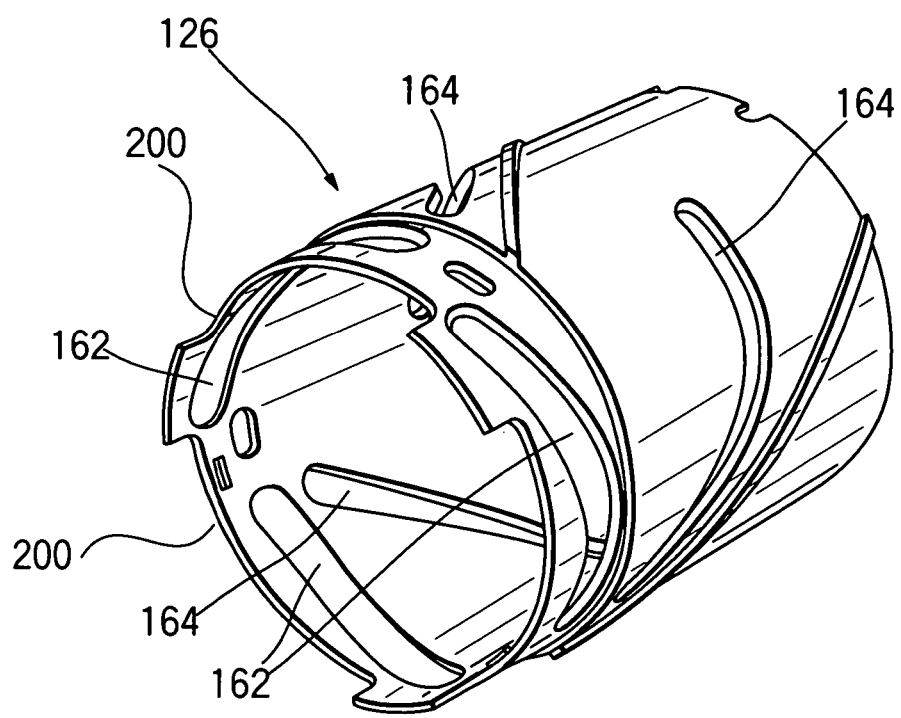
FIG. 5 is a perspective view showing a cam barrel of the zoom lens cited as Patent Document 1.

FIG. 1 depicts a partial vertical cross-section of a first preferred embodiment of the present invention, and a zoom lens system of three groups of lens elements surrounded by a lens barrel is in a telephoto adjustment setting. FIG. 2 similarly depicts a partial vertical cross section of the first preferred embodiment of the present invention, and the zoom lens system of three groups of lens elements surrounded by the lens barrel is in a wide-angle adjustment setting. FIG. 3 is an exploded view of a cam barrel of the first preferred embodiment.

An exemplary zoom lens system 1 of three groups of lens elements is, as shown in FIGS. 1 and 2, comprised of a first group of lens elements 10 closest to the object, a second group of lens elements 12, and a third group of lens elements 14 closest to a camera body (not shown). A lens barrel is provided with a mount 20 serving as an attachment member to the camera body (not shown), an inner fixed barrel 22 integrated with and located inside the mount 20, and an outer fixed barrel 24 integrated with and located outside the mount 20. A focusing ring 26 resides in position outside the outer fixed barrel 24 and closer to the mount 20 so as to be rotatable about the optical axis. A zoom ring 28 further resides in position outside the outer fixed barrel 24 closer to the object so as to be rotatable about the optical axis.

A cam barrel 30 lies over an outer surface of the inner fixed barrel 22 so as to be slidable along and rotatable about the optical axis. As can be seen in the exploded view of FIG. 3, the cam barrel 30 has cam ridges 32 related to the first group of lens elements, cam grooves 34 related to the second group of lens elements, cam grooves 36 related to the third group of lens elements, and notches 38 serving as bolt holes of linearly-sliding studs. The cam ridges 32 extend closer to the object than rear edges of the notches 38 closer to the mount. This is because an adjustment from the wide-angle setting to the telephoto setting permits an inner linearly-shuttling barrel 40 with linearly-sliding studs 42 implanted therein to move closer to the object, and hence, there is no need of enlarging the notches 38 to let the linearly-sliding studs disengage therein. Thus, on the assumption that, although substantially extended, an extension of the cam ridges 32 is unvaried along the optical axis, the cam barrel 30 relatively reduces its length compared with the prior art counterpart, and resultantly, the lens system, as a whole, can be advantageously downsized.

The inner linearly-shuttling barrel 40, which resides over the inner surface of the inner fixed barrel 22, is guided to linearly slide, as a result of fitting its associated elements in linear grooves (not shown) in the inner fixed barrel 22 and the cam grooves 36 in the cam barrel 30. The inner linearly-shuttling barrel 40 has studs 37 related to the third group of lens elements, which are fitted in the linear grooves (not shown) of the inner fixed barrel 22 and the cam grooves 36 of the cam barrel 30 so as to hold the third group of lenses 14, and it also has linearly-sliding studs 42 implanted in its foremost edge closer to the object.

A lens barrel 44 carrying the second group of lens elements also lies over the inner surface of the inner fixed barrel 22, and it is guided to revolve about the optical axis and linearly slide, as a result of fitting its associated elements in cam grooves (not shown) of the inner fixed barrel 22 and the linear grooves 34 of the cam barrel 30. The lens barrel 44 is provided with studs 43 related to the second group of lens elements, which are fitted in the cam grooves (not shown) of the inner fixed barrel 22 and the linear grooves 34 of the cam barrel 30, and the lens barrel 44 holds the second group of lens elements 12.

A lens barrel 46 carrying the first group of lens elements 10 lies over the inner surface of the outer fixed barrel 24 so as to be slidable either linearly or along the optical axis. A linearly-shuttling barrel 50 carrying the first group of lens elements further resides over the inner surface of the lens barrel 46 so as to be slidable along the optical axis. The linearly-shuttling barrel 50 has linear grooves 50 defined in its inner surface so as to fit on the linearly-sliding studs 42. The lens barrel 46 carrying the first group of lens elements and the linearly-shuttling barrel 50 are engaged with each other in a manner of helicoidal coupling.

An operation of the aforementioned zoom lens system of three groups of lens elements in the first preferred embodiment will be described below.

As the zoom ring 28, positioned outside the outer fixed barrel closer to the object, is rotated about the optical axis, a zoom rotation transmitting mechanism (not shown) intervenes to revolve the cam barrel 30. In this way, the first group of lens elements 10 move along the optical axis with an aid of the cam ridges 32, the second group of lens elements move along the optical axis with an aid of the cam grooves 34, and the third group of lens elements move along the optical axis with the aid of the cam grooves 36, and thus, the zooming adjustment is carried out.

As the focusing ring 26 outside the outer fixed barrel 24 closer to the mount 20 is rotated about the optical axis, a focusing rotation transmitting mechanism (not shown) intervenes to revolve a lens frame 46 holding the first group of lens elements. In this way, the manner of the helicoidal coupling of the lens frame 46 with the linearly-shuttling barrel 50 is altered, which causes the first group of lens elements 10 to move along the optical axis, and thus, the focusing adjustment is attained.

Embodiment 2

Another or a second preferred embodiment of the lens system according to the present invention is a fixed focus lens. Among all the groups of lens elements, two groups of them dedicated to the focusing are the one closest to the object and the rearmost one. In the second embodiment of the lens system, there are provided a first fixed barrel, a linearly-shuttling barrel located inside the first fixed barrel so as to slide along the optical axis, for carrying the rearmost group of lens elements, a cam barrel having at least two types of cams and located outside the fixed barrel so as to be slidable along and rotatable about the optical axis, a second fixed barrel outside the cam barrel, linearly-sliding studs positioned in a foremost edge of the linearly-shuttling barrel closer to the object, and a lens barrel carrying the foremost group of lens elements closest to the object; and the lens barrel resides over an inner surface of the second fixed barrel so as to be slidable and is provided with linear grooves in which the linearly-sliding studs are fitted.

What is claimed is:

1. A lens system comprising
   a foremost group of lens elements closest to the object,
   a rearmost group of lens elements farthest from the object,
   a first fixed barrel,
   a linearly-shuttling barrel residing inside the first fixed barrel so as to be slidable along the optical axis, for carrying the rearmost group of lens elements,
   a cam barrel having at least two types of cams and residing outside the first fixed barrel so as to be rotatable about the optical axis,
   a second fixed barrel residing outside the cam barrel, linearly-sliding studs positioned in a forward edge of the linearly-shuttling barrel closer to the object, and
   a lens barrel residing over an inner surface of the second fixed barrel so as to be slidable thereover and provided with linear grooves in which the linearly-sliding studs are fitted, for carrying the foremost group of lens elements.

2. A lens system according to claim 1, wherein recessed edges of the notches defined in the cam barrel closer to a mount are in positions behind forward ends of at least one type of the cams in the cam barrel closer to the object.

3. A zoom lens system of three groups of, or first to third groups of lens elements, the first group of lens elements being the foremost group of lens elements closest to the object as defined in claim 1 while the third group of lens elements is the rearmost group of lens elements.

4. A fixed focus lens system having focusing lenses of the foremost and rearmost groups of lens elements surrounded by the lens barrel as defined in claim 1.

5. A lens barrel comprising
   a first fixed barrel,
   a linearly-shuttling barrel residing inside the first fixed barrel so as to be slidable along the optical axis, for carrying a rearmost group of lens elements,
   a cam barrel having at least two types of cams and residing outside the first fixed barrel so as to be rotatable about the optical axis,
   a second fixed barrel residing outside the cam barrel, linearly-sliding studs positioned in a forward edge of the linearly-shuttling barrel closer to the object, and
   a lens carrying barrel residing over an inner surface of the second fixed barrel so as to be slidable thereover and provided with linear grooves in which the linearly-sliding studs are fitted, for carrying a foremost group of lens elements.

6. A lens barrel according to claim 5, wherein recessed edges of the notches defined in the cam barrel closer to a mount are in positions behind forward ends of at least one type of the cams in the cam barrel closer to the object.

7. A zoom lens system of three groups of, or first to third groups of lens elements, the first group of lens elements being the foremost group of lens elements closest to the object as defined in claim 5 while the third group of lens elements is the rearmost group of lens elements.

8. A fixed focus lens system having focusing lenses of the foremost and rearmost groups of lens elements surrounded by the lens carrying barrel as defined in claim 5.

* * * * *